(12) United States Patent
Espig (10) Patent No.: US 10,864,858 B2
(45) Date of Patent: Dec. 15, 2020

(54) ROOF BOX SYSTEM FOR MOTOR VEHICLES AND CASE FOR A ROOF BOX SYSTEM

(71) Applicant: SEs Solutions GmbH, Freital (DE)

(72) Inventor: Serle Espig, Hamburg (DE)

(73) Assignee: SEs Solutions GmbH, Freital (DE)

( * ) Notice: Subject to any disclaimer, the term of this patent is extended or adjusted under 35 U.S.C. 154(b) by 0 days.

(21) Appl. No.: 15/832,302

(22) Filed: Dec. 5, 2017

(65) Prior Publication Data

US 2018/0098608 A1 Apr. 12, 2018

Related U.S. Application Data

(62) Division of application No. 14/760,334, filed as application No. PCT/EP2014/050378 on Jan. 10, 2014, now Pat. No. 9,854,885.

(30) Foreign Application Priority Data

Jan. 10, 2013 (DE) .......................... 10 2013 100 223
Jan. 16, 2013 (DE) .......................... 10 2013 100 437

(51) Int. Cl.
*B60R 9/045* (2006.01)
*B60R 9/05* (2006.01)
(Continued)

(52) U.S. Cl.
CPC ................ *B60R 9/045* (2013.01); *A45C 5/14* (2013.01); *A45C 7/0077* (2013.01); *B60R 9/05* (2013.01);
(Continued)

(58) Field of Classification Search
CPC ............ B60R 9/05; B60R 9/045; B60R 9/055
(Continued)

(56) References Cited

U.S. PATENT DOCUMENTS 2,196,341 A 4/1940 Weaver
2,268,881 A 1/1942 Rotkiewicz et al.
(Continued)

FOREIGN PATENT DOCUMENTS

DE 40 38 081 A1 6/1992
DE 60 2005 002 301 T2 5/2008
WO WO 2012/074307 A2 6/2012

OTHER PUBLICATIONS

International Search Report (PCT/ISA/210) dated Jun. 11, 2014 with English-language translation (ten (10) pages).

*Primary Examiner* — Dennis H Pedder
(74) *Attorney, Agent, or Firm* — Crowell & Moring LLP (57) ABSTRACT

In order to provide a roof box system (100) for a motor vehicle (11) which is easy to handle and which can be used in many different ways and which features an aerodynamically advantageous shape, it is proposed that the roof box system (100) shall include a roof (10) of a motor vehicle (11) which includes at least one ceiling element (13) which is installed on at least one roof base element (12) and an insertion element (18) with at least one outer wall. Pursuant to the invention, the at least one ceiling element (13) can be moved from an initial state to a receiving state so that an interspace (15) suitable for receiving the insertion element (18) is formed, and, in the receiving state, the insertion element (18) can be arranged in the interspace (15) so that the at least one outer wall of the insertion element (18) forms an outer surface (26, 27) of the roof box system (100).

15 Claims, 7 Drawing Sheets

(51) Int. Cl.
    *B60R 9/055*     (2006.01)
    *A45C 7/00*      (2006.01)
    *A45C 5/14*      (2006.01)
    *A45C 9/00*      (2006.01)
(52) U.S. Cl.
    CPC ........ *B60R 9/055* (2013.01); *A45C 2009/005* (2013.01)
(58) Field of Classification Search
    USPC ....... 224/309, 310, 314, 319, 320, 327, 318; 296/107.16, 216.02, 26.01, 26.04, 26.06, 296/26.07, 37.7
    See application file for complete search history.

(56) References Cited

U.S. PATENT DOCUMENTS

| | | | |
|---|---|---|---|
| 3,879,080 A * | 4/1975 | Freeman | ................ B60R 5/042 296/26.06 |
| 4,087,102 A | 5/1978 | Sprague | |
| 5,156,568 A | 10/1992 | Ricci | |
| 5,535,929 A | 7/1996 | Neill | |
| 5,667,116 A | 9/1997 | Reinhart et al. | |
| 2008/0224492 A1 | 9/2008 | Adams et al. | |

* cited by examiner

ROOF BOX SYSTEM FOR MOTOR VEHICLES AND CASE FOR A ROOF BOX SYSTEM

CROSS REFERENCE TO RELATED APPLICATIONS

This application is a divisional of U.S. application Ser. No. 14/760,334, filed Jul. 10, 2015, which is a National Phase of PCT International Application No. PCT/EP2014/050378, filed Jan. 10, 2014, the entire disclosures of which are herein expressly incorporated by reference.

DESCRIPTION

The invention relates to a roof box system for motor vehicles as well as for a roof box system

STATE OF THE ART

Conventional roof boxes are closed or closable containers for storing luggage, which allow for transport of additional luggage, such as skiing gear, with a motor vehicle outside of the usual storage areas such as the trunk. They are installed on the roof of the motor vehicle, usually on a roof railing or roof racks provided by the manufacturer for this purpose. A roof box increases the fuel consumption of the motor vehicle since it increases the weight and the air resistance of the motor vehicle. Additionally, driving noise is increased and the achievable or permissible top speed of the vehicle is reduced. Therefore, if the additional storage capacity of the roof box is not required, it must be uninstalled and stored somewhere else. Storing the roof box requires significant space; this is especially disadvantageous if no suitable garage or storage room is available.

From DE 60 2005 002 301 T2 a vehicle roof body part of a motor vehicle is known which is designed as a container that defines a storage room, where this container is equipped with a flap which can be accessed from outside the motor vehicle. So this container is integrated into the roof of the motor vehicle and it is not necessary to install or uninstall it. This also reduces the fuel consumption as well as the driving noise. However, it is disadvantageous that the container only provides very limited storage capacity since the height of the container is limited to the thickness of the motor vehicle roof.

DESCRIPTION OF THE INVENTION: OBJECT, SOLUTION, ADVANTAGES

The object of this invention is to provide a roof box system which is integrated into the roof of a motor vehicle and which is easy and versatile to use. Furthermore, it shall feature an aerodynamically advantageous shape.

This object is solved by a roof box system for motor vehicles with the features of claim 1. Another solution is provided by means of a case which is, according to the features of claim 14, suitable for use with a roof box system for motor vehicles according to claim 1.

The roof box system for motor vehicles pursuant to the invention includes a roof of a motor vehicle, which features at least one ceiling element which is arranged on a roof base element, and an insertion element with at least one outer wall, where the at least one ceiling element can be moved from an initial state to a receiving state to form an interspace which is suitable for receiving the insertion element between the at least one ceiling element and the roof base element, where it is possible to arrange the insertion element in the interspace, which is formed in the receiving state, so that the at least one outer wall of the insertion element forms an outer surface of the roof box system.

One advantage of the roof box system for motor vehicles pursuant to the invention is the fact that the handling is simplified since the user no longer needs to install additional retaining structures such as roof racks due to the integrated arrangement of the roof box system in the roof of a motor vehicle. Another advantage of the integrated installation is that, in its initial state, the roof box system is integrated into the roof of the motor vehicle so that the air resistance of the motor vehicle is not increased. An especially important advantage is that, by moving the at least one ceiling element, an interspace, in which an insertion element can be easily arranged, can be formed between the ceiling element and the roof base element. Since the insertion element, which is arranged in the interspace, forms an outer surface of the roof box system with at least one outer wall, this outer surface must not be integrated into the roof of the motor vehicle as an additional element. The reduced number of elements integrated into the roof results in a simplified and mechanically more stable roof box structure.

Advantageous designs of the roof box system pursuant to the invention are characterized in the sub-claims.

In an advantageous design, the insertion element includes a, preferably closed or closable, storage room which is suitable for storing transport goods such as luggage or bags. By storing transport goods, e.g. luggage, in the storing room of the insertion element and by arranging the insertion element in the interspace between the at least one ceiling element and the roof base element, it is therefore possible to provide a roof box system for a motor vehicle which can be used to transport luggage with the motor vehicle. It is especially preferred that the insertion element features a flap or a cover which can be opened and closed, where the storage room can be accessed by the user in order to fill the storage room while the flap or cover is opened. Furthermore, it is in particular preferred that the storage room of the insertion element is impermeable to splash-water when the flap or cover is closed.

In an advantageous design, the ceiling element is arranged above the roof base element in vertical direction. Furthermore, the roof base element basically includes the lower side of the roof of the motor vehicle which faces the passenger compartment of the motor vehicle. This arrangement provides the advantage that the room available to the passengers inside the passenger compartment is not reduced when moving the ceiling element from the initial state to the receiving state.

In another practicable design, the ceiling element is arranged on the roof base element in a swivelable manner. In particular, the ceiling element is arranged at the roof base element so that it may be swiveled around a horizontal axis, preferably a horizontal axis which is arranged perpendicular to the traveling direction of the motor vehicle. In this case, the axis is preferably arranged in the front part, when viewing in the driving direction of the motor vehicle, of the roof base element. By arranging the axis in the front part of the roof base element, the drag coefficient of the vehicle roof is increased only by a small amount when swiveling the ceiling element since the airstream, which occurs while the motor vehicle is driving, streams at and around the ceiling element, which has been set up or moved to the receiving state, in an aerodynamically favorable way.

A further preferred design form of the roof box system is characterized in that the roof box system features transformation means for the reversible reshaping of the at least one ceiling element or a section of the at least one ceiling element from an initial transformation state, which is identical with the initial state of the at least one ceiling element, to a second transformation state, which is identical with the receiving state of the at least one ceiling element, where an activation device is provided for activation of the transformation means. In this case, it might be intended that the transformation of the at least one ceiling element or the section of the at least one ceiling element includes a bending of the at least one ceiling element or the section of the at least one ceiling element, where predetermined bending points or bending lines are provided in the at least one ceiling element or the section of the at least one ceiling element, around which be bending takes place. In this case, the transformation means may include one or multiple piezo elements which are preferably arranged in the at least one ceiling element in an integrated manner. Furthermore, the transformation means may feature electrical contacts or mechanical transformation means such as a telescopic rod or swivelable linkages.

This results in a particularly practicable type of design if the at least one ceiling element or the section of the at least one ceiling element includes shape-memory material such as shape-memory alloys or shape-memory polymers. Also, the at least one ceiling element or the section of the at least one ceiling element may be made of stretchable material and the transformation means may be designed in such a manner that they are capable of bringing the at least one ceiling element or the section of the at least one ceiling element from an unstretched state into a stretched state and vice versa. By using transformation means in combination with ceiling elements or sections of ceiling elements which are made of stretchable material or which can be bent by the transformation means, the roof box system can be completely integrated into the motor vehicle roof of a vehicle in a very advantageous manner.

In another preferred type of design of the roof box system, the shape of the interspace, which is formed in the receiving state, and the shape of the insertion element are essentially complementary to each other. In this case, the insertion element essentially completely fills out the interspace as soon as it is arranged in it. In this context, complementary means that an imaginary boundary surface, which encloses the interspace and which is defined by the side of the ceiling element facing the roof base element and the side of the roof base element facing the ceiling element as well as additional imaginary surfaces which enclose the interspace in a three-dimensional domain, and an imaginary surface which envelops the insertion element are essentially identical in terms of shape and volume. In this case, the insertion element can be arranged in the interspace so that it essentially or completely fills out the interspace. In this case, however, it might be practicable that the insertion element does not fill out sections of the interspace which are especially inaccessible. It is advantageous that, due to the complementarity of the insertion element and the interspace, a large portion of the interspace may be utilized.

In another advantageous type of design, the interspace which is formed in the receiving state is essentially wedge-shaped, i.e. the interspace features a shape which decreases in height towards the front, when viewing into the driving direction of the motor vehicle. Accordingly, it is very advantageous that the insertion element features a complementary and essentially also wedge-shaped shape so that the insertion element can be inserted in a way so that it is flush with the interspace. The wedge shape, which is formed in the receiving state and which tapers to the front, results in especially advantageous aerodynamics of the motor vehicle roof which also has a positive effect on fuel consumption.

Another practicable design of the roof box system is achieved when the insertion element includes at least three outer walls which form three outer surfaces, in particular two side surfaces and one rear surface of the roof box system, when the insertion element is arranged in the interspace in the receiving state. In this case, the insertion element may, in particular advantageously, feature a wedge shape. When the insertion element is arranged in the interspace, two of the five outer walls of the wedge-shaped insertion element touch the ceiling element or the roof base element while the remaining three outer walls of the insertion element form two outside surfaces and one rear surface of the roof box system. However, side walls may basically also be provided in the area between the roof base element and the ceiling element, where the side walls are preferably integrated into or arranged at the roof of the motor vehicle so that these side walls form two outer surfaces of the roof box system in the receiving state and one outer wall of the insertion element forms the rear surface of the roof box system. It is also possible that the side walls form one outer surface and the rear surface of the roof box system in the receiving state and that one outer wall of the insertion element forms another outer surface of the roof box system. The side walls in the area between the roof base element and the ceiling element may be designed as cloth elements or as metal or plastic elements which are, in particular, arranged between the roof base element and the ceiling element in the initial state. However, the at least one ceiling element or a section of the at least one ceiling element may also form the side walls. This design is especially advantageous if the at least one ceiling element or a section of the at least one ceiling element may be transformed from a first transformation state, which equals the initial state of the at least one ceiling element, to a second transformation state which equals the receiving state of the at least one ceiling element.

It is especially advantageous if the at least one ceiling element and the insertion element, which is arranged in the interspace in the receiving state, form an aerodynamically advantageous shape which is arranged at the roof base element. In this case, it is especially advantageous if this shape features only minor gap dimensions, in particular in the transition area between the at least one ceiling element and the insertion element. This provides the advantage that only minor air turbulences are achieved in the transition areas of the at least one ceiling element and the insertion element during operation of the motor vehicle.

In another preferred design type, the roof box system features a first guiding means, in particular guide rails or guide bars on the at least one ceiling element, especially on the inside of the at least one ceiling element, and/or the roof base element. Additionally, it is preferred that the insertion element includes a second guiding means which may be mechanically connected with the first guiding means, where the second guiding means includes, in particular, rollers, bars or pins. In this case, it is especially advantageous if the insertion element can be especially easily inserted into the interspace between the roof base element and the ceiling element due to the combination of the first and the second guiding means. Advantageously, the second guiding means, in particular the rollers, bars or pins, are mechanically connected with the first guiding means, in particular with the guide rails or guide bars, to insert the insertion element into the interspace. The mechanically connected first and second guiding means, e.g. the rollers connected with guide rails, bars or pins, result in a repeatable and position-accurate guiding of the insertion element into the interspace.

As an additional advantage, the roof box system features locking means. In this case, the insertion element, which is inserted into the interspace, may be fixed in the interspace in a transport position by means of the locking means so that the insertion element may be safely transported with the motor vehicle. In this case, the locking means may be arranged on the roof of the motor vehicle, in particular on the roof base element and/or the at least one ceiling element. However, a design type in which the locking means are arranged on the insertion element is also possible.

In another advantageous design type, the first or second guiding means is motor-driven. By means of the motor-driven guiding means, the insertion element may be inserted into and removed from the interspace without effort by the user.

In this case, an especially practicable design type of the roof box system includes an insertion element which is designed as a case, especially a hard-top case, rolling case or trolley case, or an insertion element which is designed as foldable buggy or bicycle trailer. In case of this design type, the insertion element serves not only as receiving element for the roof box system but may also be used, independent from the arrangement in the interspace, as transport or carrying means. In this case, the insertion element which is designed as case, hard-top case, rolling case or trolley or as buggy or bicycle trailer is structured so that it may be brought into a state in which the insertion element is essentially complementary to the interspace which is formed in the receiving state.

In another practicable design, the insertion element, in particular the insertion element designed as hard-top case, rolling case, trolley, buggy or bicycle trailer, includes rollers, where the rollers are designed so that they may be sunk into the insertion element and/or are foldable so that the sunk or folded rollers do not protrude from the insertion element. This way, the insertion element may be easily moved, e.g. pulled or pushed, by means of its rollers. For arranging the insertion element, e.g. the hard-top case, rolling case, trolley or buggy, the rollers are preferably sunk or folded so that they do not protrude from the insertion element and effect the insertion of the insertion element into the interspace in a disadvantageous way. However, the rollers of the insertion element may also be designed unsinkable or unfoldable or only partly sinkable or partly foldable. In case of this design type, the rollers may be designed as second guiding means of the insertion element. The rollers may also be automatically or manually sinkable. So, it is in particular possible that the rollers are sunk or extended by means of the snapping of the insertion element or the case into the interspace.

Advantageously, the insertion element which is designed as rolling case may also feature a pull handle. In this case, the pull handle may be connected to a trigger mechanism. This way, it is possible that the trigger mechanism is actuated and the rollers are automatically sunk when the pull handle is pushed in.

In case of an especially preferred design type of the roof box system, the ceiling element features an opening, in particular an opening for a sunroof. Additionally, the at least one ceiling element features a complementary opening which corresponds to the shape of the opening or the shape of the sunroof, where the complementary opening is essentially arranged above the opening in the roof base element in vertical direction so that, in the initial state of the at least one ceiling element, the complementary opening of the at least one ceiling element is arranged congruently on the opening of the roof base element. In this case, a sunroof may be arranged in the opening of the roof base element. In the initial state of the roof box system, the complementary opening of the ceiling element congruently lies on the opening of the roof base element, i.e. the sunroof. This way, by means of the complementary opening, it is possible that light may enter the interior of the passenger compartment via the sunroof. Furthermore, air may enter and/or escape the passenger compartment by opening and closing the sunroof, where the air escapes from the passenger compartment to the exterior via the sunroof and via the complementary opening and vice versa.

Practicably, a sunroof or a folding roof may be arranged in the roof base element, where the guiding means of the sunroof or the folding roof feature or are identical with the first guiding means of the roof box system.

It is very especially preferred that the insertion element features a closing element which corresponds to the shape of the complementary opening of the at least one ceiling element. In this case, this closing element may, in particular, feature a shield-shaped design. In this case, it is practicable that the closing element, in terms of shape, accurately fits into the complementary opening of the at least one ceiling element when the insertion element is inserted into the interspace in the receiving state. By means of the, in terms of shape, accurate fitting of the, in particular, shield-shaped closing element of the insertion element, the complementary opening of the ceiling element may be closed in a plane and flush manner when the insertion element is inserted into the interspace.

Additionally, the closing element, or the shield-shaped closing element, of the insertion element may preferably be made of metal or plastic and it may, in particular, be painted in the car color or the color of the ceiling element. Also, at least one outer wall of the insertion element may preferably be painted in the car color.

Another especially preferable design type of the roof box system is achieved if the roof of the roof box system is designed as a convertible roof, in particular as a convertible roof which can be sunk under a trunk cover.

In another practicable and advanced design of the roof box system, the roof of the roof box system is designed as a convertible roof, where the roof base element of the roof features a first layer of hood material and where preferably the at least one ceiling element features a second layer of hood material.

In this case, the first layer of hood material and/or the second layer of hood material may be made of any material which is suitable for a convertible roof. Thus, the term hood material includes woven, impregnated materials but also plastics and/or metal sheets which are, in particular, suitable for so called "hard-top" convertible roofs. Furthermore, the first and/or second layer of hood material may also be reinforced by means of reinforcing elements. In case of this patent application, the term layer also includes the terms wall, foil, plate, and cloth element. Furthermore, layers may be designed in a rigid and/or bendable manner.

The at least one ceiling element, which features a second layer of hood material, may advantageously be moved from the initial state to the receiving state so that an interspace which is suitable for receiving the insertion element is formed between the at least one ceiling element and the roof base element, which features a first layer of hood material. This way, the insertion element may be arranged in the interspace in the receiving state so that at least one outer wall of the insertion element forms an outer surface of the roof box system. This results in the advantage that the roof box system, in the practicable advanced design, is also suitable for use in motor vehicles which are designed as a convertible. Thus, in contrast to conventional, known roof box systems in case of which a roof box is usually installed on a roof railing or on roof racks which have been provided for this purpose by the manufacturer and which are therefore not suitable for convertibles, a roof box system which is also suitable for a convertible roof or a convertible hood is provided.

The ceiling element may, in an advantageous manner, feature a frame on which the second layer of hood material, which is designated as outer layer, is spanned or on which the outer layer may be installed. In this case, the frame is preferably arranged on the ceiling element in a manner so that the ceiling element is arranged on the roof base element in a swivelable manner. If the ceiling element including the frame is arranged in a swivelable manner around a horizontal axis perpendicular to the driving direction of the motor vehicle, a hinge is preferably provided in the area of the horizontal axis in order to form the swivel connection. In the receiving state, which is achieved by moving the at least one ceiling element in relation to the roof base element, which features the first layer of hood material, the roof box system is thus, in case of this design type, already essentially rigid without arranging the insertion element in the interspace between ceiling element and roof base element due to the rigidifying effect of the frame. By inserting the insertion element into the interspace, the roof box system can be further rigidified. Furthermore, the frame may be designed and/or arranged on the ceiling element so that it does not interfere with an existing fold mechanism of the convertible roof.

Alternatively, the at least one ceiling element may also be designed without a frame so that the ceiling element essentially exclusively includes the second layer of hood material or the outer layer. In case of the alternative design, the ceiling element which has been moved into the receiving state can be preferably rigidified or stabilized by inserting the insertion element into the interspace, or the first layer of hood material and/or the second layer of hood material possess a sufficient rigidity even without frame. This is the case in case of "hardtop" convertible roofs in particular. Preferably, at least one outer wall of the insertion element forms one outer surface of the roof box system. However, it is also possible that all outer surfaces are realized by means of elements or components of the convertible roof.

In case of a preferred design type of the roof box system, the side walls are provided in the area between the roof base element and the at least one ceiling element, where the side walls form two outer surfaces of the roof box system in the receiving state and where an outer wall of the insertion element forms the rear surface of the roof box system. However, the side walls may also form one outer surface and the rear surface of the roof box system and the outer wall of the insertion element forms another outer surface of the roof box system.

If the roof of the roof box system is designed as a convertible roof, it is also possible that the at least one ceiling element or a section of the at least one ceiling element includes the side walls. It is especially preferred that a section of the second layer of hood material or the outer layer is designed as side wall. Furthermore, it is also possible that the roof base element or a section of the roof base element includes the side walls. In case of the preferable design, the side walls and/or a section of the at least one ceiling element and/or the roof base element which includes the side walls is connected to the ceiling element and/or the roof base element by means of folding hinges. However, the connection may also be carried out by means of other connection methods such as sewing or gluing.

In the initial state, the second layer of hood material of the at least one ceiling element preferably lies on the first layer of hood material of the roof base element so that it is arranged on or in direct vicinity of the first layer of hood material of the roof base element. Furthermore, the side walls may preferably also be made of or contain a hood material. The side walls are practicably connected to the ceiling element and/or the roof element preferably by means of folding hinges, where the folding hinges are arranged on the sides of the convertible roof, preferably approximately above the side window or the passenger doors, in the initial state and are furthermore preferably arranged in longitudinal direction of the vehicle. In the initial state, the side walls may be folded along at least one folding line and be arranged either between the at least one ceiling element and the roof base element or laterally, in the direction of the side windows and passenger doors, next to the ceiling element and the roof base element which are overlaying each other or in the direct vicinity of each other.

When moving the at least one ceiling element into the receiving state, which is preferably achieved by vertically moving the at least one ceiling element, an interspace, in which the insertion element can be arranged, is provided between the roof base element and the at least one ceiling element In this case, the at least one ceiling element, which includes the outer layer, preferably swivels around a horizontal axis perpendicular to the driving direction in the front area of the convertible roof. The side walls, which are preferably also made of a hood material and which are, in the initial state, either arranged between the ceiling element and the roof base element or outside of and next to the roof base element and the ceiling element, are spanned between the at least one ceiling element and the roof base element in the receiving state and are preferably connected to the ceiling element and the roof base element by means of folding hinges. During the movement from the initial state to the receiving state, the side walls preferably unfold along a folding line of the side walls and form two outer surfaces of the roof box system in the receiving state. The insertion element can be inserted into the interspace and preferably forms a rear surface of the roof box system by means of the outer wall of the insertion element.

In order to support and ease the movement between the initial state and the receiving state, the side walls may feature a flexible, preferably elastic, material which unfolds or erects or smoothens itself in released condition. Thus, the side walls feature a spring effect which supports or eases the movement of the ceiling element from the initial state to the receiving state. At the same time or as an alternative, additional spring elements, which support the movement from the initial state to the receiving state, may be provided. Furthermore, electrically driven movement means such as actuators or linear motors may be provided which move the at least one ceiling element into the receiving state in an electrically controlled manner.

In order to prevent an unintended movement of the at least one ceiling element into the receiving state, a locking mechanism may be provided. Only when manually actuating or releasing the locking mechanism, the movement to the receiving state becomes possible. However, the locking mechanism may also be released in an electronic manner or by means of a suitable mechanical system. Furthermore, a connection means may be provided for securing the at least one ceiling element on the roof base element. Preferably, the connection means includes a hook-and-loop fastener and/or an adhesive fastener and/or a zipper. If the at least one ceiling element lies on the roof base element or is located in the direct vicinity of the roof base element, the at least one ceiling element can be secured on the roof base element by means of the connection means so that an unintended movement to the receiving state is prevented.

Preferably, the side walls are fastened to the at least one ceiling element and/or the roof base element by means of the folding hinges, where the side walls are sewed to the folding hinge and/or the roof base element and/or the ceiling element for fastening. However, it is also possible that the side walls are designed so that they are removable and fastened to the ceiling element and/or roof base element and/or folding hinge by means of an adhesive fastener or zipper. Furthermore, the side walls may also be designed as sections of the at least one ceiling element and/or the roof base element so that they form one piece with the ceiling element and/or roof base element.

An additional solution for the objective on which the invention is based is provided by a case which is suitably designed for a roof box system pursuant to the invention.

Advantageous designs of the case pursuant to the invention are characterized in the sub-claims.

In an advantageous type of design, the case is characterized in that the case essentially features a wedge shape and/or that the case is designed as rolling case or trolley and/or the case features rollers, where the rollers are designed so that they can be sunk into the main body of the case and/or are foldable in a manner so that the sunk or folded rollers preferably do not protrude from the main body of the case, where the rollers are preferably designed as second guiding means.

In another aspect of the invention, a roof box system, which includes a roof of a motor vehicle with a roof base element and an insertion element, is provided, where the insertion element can be installed on top of the roof base element and fastened to it in a removable manner so that one outer wall of the insertion element, when installed on top of the roof base element, forms one outer surface of the roof box system, the insertion element features an interior space, and the insertion element features volume-changing means, where the volume of the interior space can be changed by means of the volume-changing means, where the insertion element can be moved between an extended state, in which the interior space features a maximum volume, and a retracted state, in which the interior space features a minimum volume, by means of the volume-changing means.

The advantage of this roof box system is that a further simplified structure of the roof box system is provided by the outer surface which is formed by one outer wall of the insertion element when it is installed on top of the roof base element. In this case, the interior space of the insertion element may serve for storing transport goods, where the size of the interior space can be adjusted to the respective transportation needs by means of the volume-changing means. The especially advantageous aspect of the roof box system is the fact that the insertion element can be installed on top of the roof base element and fastened to it in a removable manner. Therefore, the insertion element can be used in a driving state of the motor vehicle, during which the insertion element is installed on the roof base element, as well as independent from the arrangement on the roof base element. In the retracted state, in particular, the dimensions of the insertion element are reduced so far that it only adds a minor amount to the thickness of the roof in vertical direction when installed on top of the roof base element so that the insertion element essentially forms a completely integrated unit with the roof base element. It is especially advantageous when the roof of the roof box system features a circumferential frame or a circumferential boundary which forms a receiving area or a fitting in combination with the roof base element into which the insertion element may be inserted so that the insertion element is completely integrated into the roof. However, the roof base element may also be designed without a circumferential frame. In the installed state, the insertion element may partly or completely cover the roof base element or, in the installed state, the insertion element may partly or completely cover the roof of the motor vehicle.

In case of another type of design, it is intended that the volume of the interior space of the insertion element, in particular not in the retracted state, is suitable for storing transport goods and/or that the volume change of the interior space by means of the volume-changing means, which include one outer wall of the insertion element in particular, can be achieved by means of folding, compressing, relocating or pushing together at least one outer wall of the insertion element and/or that the insertion element can be installed on the roof base element and fastened to it in a removable manner from the outside in retracted and extended state.

The advantageous volume change of the interior space of the insertion element which is suitable for storing transport goods is achieved by means of volume-changing means which may include one outer wall of the insertion element. If the volume-changing means include one outer wall of the insertion element, additional means for volume changing are essentially not required, which leads to a simplified roof box structure. In this case, it is especially advantageous and structurally efficient to achieve the volume change by means of folding, compressing, relocating or pushing together at least one outer wall of the insertion element. For example, it is possible that an outer wall of the insertion element features a two-part design, where a first part of the outer wall is connected to a second part of the outer wall by means of a hinge. Via the hinge, it is possible to collapse or fold the outer wall which results in a volume change of the interior space. It is especially advantageous that the insertion element can be installed on top of the roof base element from the outside in the retracted as well as the extended state. In this case, the insertion element is especially space-saving in the retracted state while the insertion element is especially well suited for the transport of transport goods in the extended state.

In case of another advantageous design type of the roof box system, fastening means, with which the insertion element which is arranged on the roof base element can be installed on it in a removable manner, are provided on the roof base element and/or on the insertion element. Furthermore, it may be intended that there is essentially no free space between the insertion element and the roof base element in the state in which it is installed on top of the roof base element and/or that the insertion element can be installed on top of the roof base element without any gaps and in a removable manner.

In this case, the fastening means may be designed as magnetic fastening. Preferably, the fastening means may also be designed as a two-part fastening means, where, for example, a hook which is arranged on the insertion element is inserted into an eye which is, in particular, arranged so that it is sunk into the roof base element. By means of the fastening means, the insertion element is advantageously installed on the roof base element in a removable manner in the driving state of the motor vehicle. It is especially advantageous that the insertion element can be arranged on the roof base element so that there is essentially no free space between the roof base element and the insertion element. It is especially preferred that the insertion element can be installed on the roof base element without any gaps. An installation without any gaps advantageously leads to a further reduction of the vertical thickness of the roof box system.

In another aspect of the invention, an insertion element, which is suitable for the previously described roof box system, is provided. In this case, it is intended that the insertion element features an interior space and that the insertion element features volume-changing means, where the volume of the interior space can be changed by means of the volume-changing means, where the insertion element can be moved between an extended state, in which the interior space features a maximum volume, and a retracted state, in which the interior space features a minimum volume, by means of the volume-changing means.

Such an insertion element is suitable for a previously described roof box system in an especially advantageous manner. Furthermore, the insertion element can be installed on top of the roof base element so that it is fully integrated into the roof.

For an advanced design of the insertion element, it is intended that the insertion element, which is designed as a trolley in particular, features a transport means which is, in particular, designed as pull handle, pushing means or carrying means, where the transport means is preferably designed as sinkable pull handle, and/or that the insertion element features a movement means, especially rollers or skids, where the movement means is designed so that it can be sunk into the main body of the insertion element and/or folded in a manner so that the sunk or folded movement means do preferably not protrude from the main body of the insertion element.

In addition to the possibility of installing the insertion element on top of the roof base element in an integrative manner, the insertion element can also be removed from the roof base element so that the insertion element, in particular as hand-held trolley, is suitable for the transport of transport goods. In this case, the transport means, in particular the sinkable pull handle, and the movement means, in particular the rollers, support the easy handling of the insertion element which is designed as a trolley. It is preferred that the insertion element, in particular the trolley, features a protective layer or, in particular, a buffer layer made of a soft and formable material. In this case, the protective layer or buffer layer is applied to or arranged on an outer wall of the insertion element which faces the base roof element in the state where the insertion element is installed on top of the roof base element. The protective layer or buffer layer provides the advantage that the risk of the formation of scratches on the roof base element during the arrangement of the insertion element, in particular the trolley, on the roof base element of the roof box system is reduced. Alternatively, one or multiple protective elements, which protrude from the outer wall of the insertion element which faces the roof base element in the state where the insertion element is installed on top of the roof base element, may be provided.

In another preferred design type of the previously described roof box system and the previously described insertion element or case, it is intended that a display means is arranged on the outer wall of the insertion element or the case. The display means may be designed as screen or as another optical signaling device. Furthermore, it is preferred that the display means is designed as touch-sensitive screen, also called "touch screen".

If the insertion element or the case is arranged between the at least one ceiling element and the roof base element or on top of the roof base element, and at least one outer wall of the insertion element therefore forms an outer surface of the roof box system, information may be displayed on the display means which is preferably arranged on this outer wall. The displayed information may, for example, be the license number of the motor vehicle or an additional signal light such as a brake light. Furthermore, the contents of the insertion element may be displayed on the display means. A camera device which is installed inside the insertion element or inside the interior space of the insertion element may be provided for this purpose. It is also possible that the display means is, at least partially, transparent so that the interior space of the insertion element can be seen directly in a visual manner.

Furthermore, if the display means is designed as a touch screen, an electronic lock, which is opened or closed by entering a code or something similar on the touch screen, may be provided at the insertion element.

Furthermore, of course, the invention also includes combinations of the previously described roof box systems and insertion elements or combinations of the features of the previously described roof box systems and insertion elements. For example, it is easy to see for an expert that the insertion element described last can, in an easy and analogous manner, be used in combination with a roof box system for a (convertible) roof in accordance with a previously described design type.

BRIEF DESCRIPTION OF THE DRAWINGS

Design examples of the invention will be explained below based on the drawings. The figures show the following.

PREFERRED DESIGN TYPE OF THE INVENTION

Figure 1:
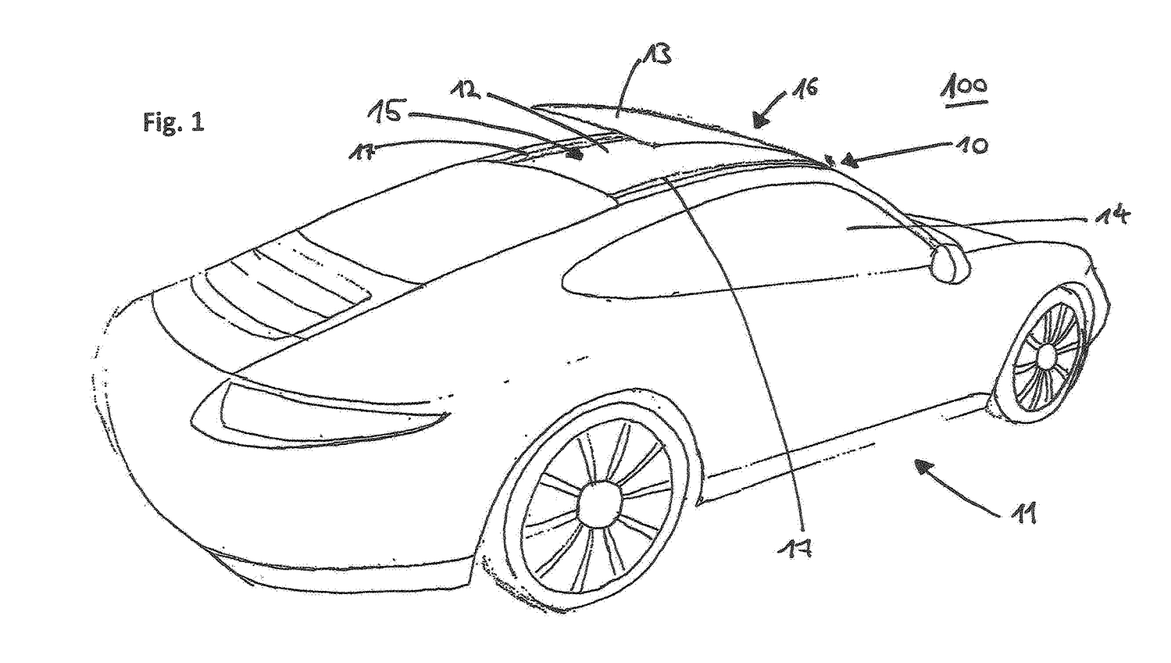
FIG. 1 shows a ceiling element and a roof base element of the roof box system for a motor vehicle in the receiving state in a perspective view.

FIG. 1 shows a preferred design type of the roof box system for motor vehicles (100) pursuant to the invention. The roof box system includes a roof (10) of a motor vehicle (11), a roof base element (12) as well as a ceiling element (13) which is arranged on the roof base element (12). In this case, the ceiling element (13) is arranged above the roof base element (12) in vertical direction and the roof base element (12) is essentially located above the passenger compartment (14) of the motor vehicle (11). In FIG. 1, the roof box system (100) is shown in the receiving state, i.e. the ceiling element (13) has been moved from an initial state to a receiving state, where an interspace (15) has been formed between the roof base element (12) and the ceiling element (13). In this case, the ceiling element (13) is arranged in the front area (16) of the roof base element (12) so that it may be swiveled around a horizontal axis which is arranged perpendicular to the driving direction of the motor vehicle (11). On the roof base element (12), two guide rails (17) which are installed in driving direction can be recognized on the outer sides. The guide rails (17) serve for guiding the insertion element (18) which is to be inserted into the interspace (15)

Figure 2:
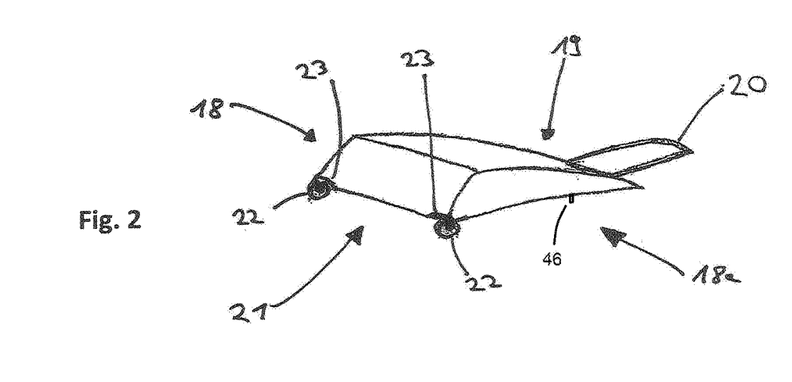
FIG. 2 shows an insertion element which is designed as a rolling case or trolley in a perspective view.

An insertion element (18) pursuant to the invention or an insertion element (18) suitable for the roof box system (100) is shown in FIG. 2. In this case, the shown insertion element (18) is designed as rolling case (18a) or trolley and is essentially wedge-shaped. A pull handle (20) which can be pushed in or sunk is arranged in a first end area (19) of the insertion element (18) or the rolling case (18a). In a second area (21) opposite the first end area (19) of the insertion element (18), which forms the lower area of the rolling case (18a) when it is pulled by a person, two foldable rollers (22) can be recognized in the outer areas. In direct vicinity of each of the rollers (22) there is one recess (23) or notch in the main body of the rolling case (18a) which serves for receiving the rollers (22) in a flush manner in the retracted or folded state. Pins (46) which engage guide rails (17) may be located on the lower portion of the insertion element (18), as discussed above.

Figure 3:
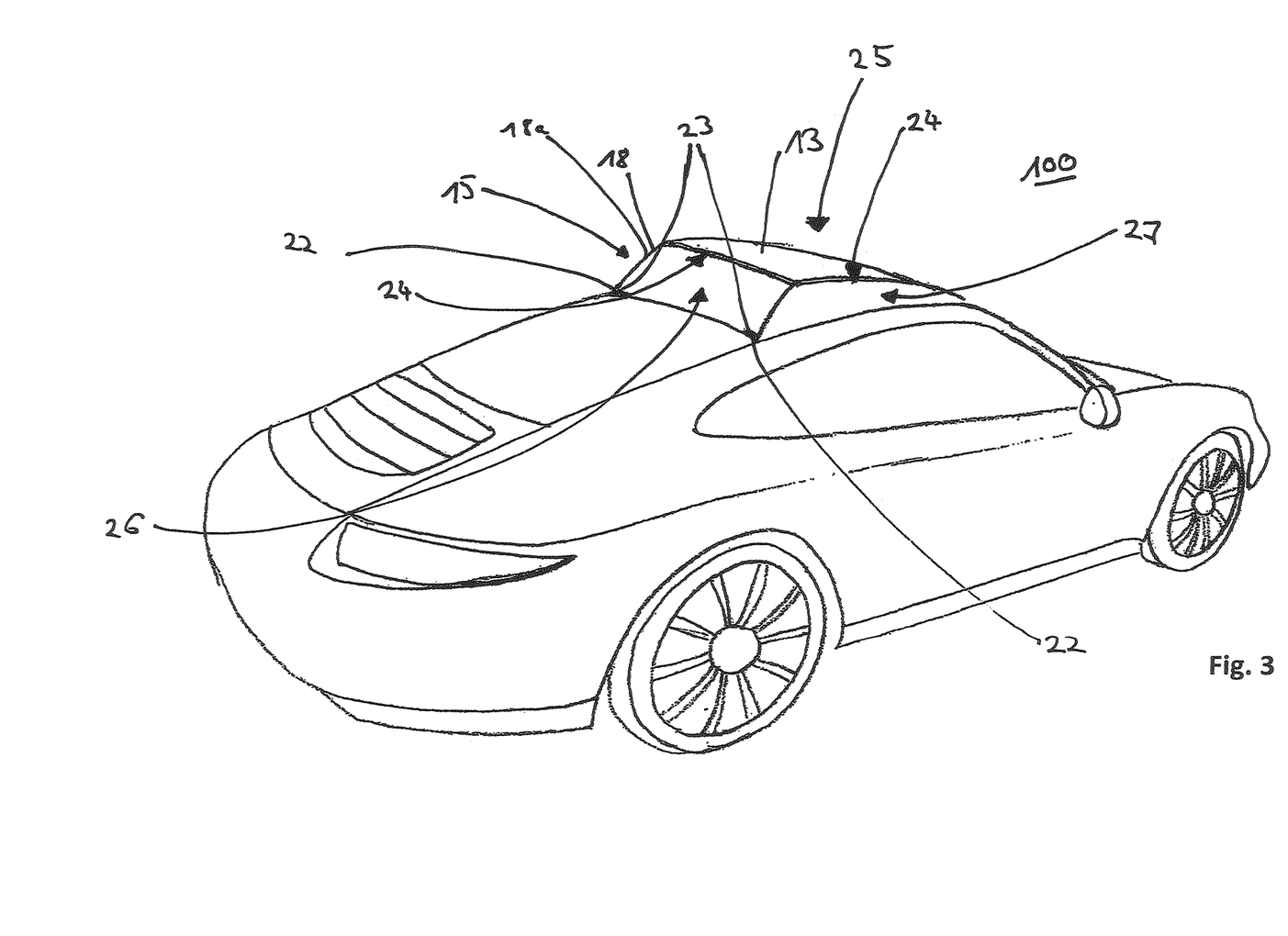
FIG. 3 shows the roof box system from FIG. 1 with an inserted insertion element in a perspective view.

FIG. 3 shows the roof box system (100) in the preferred design type with the insertion element (18), which is here shown as rolling case (18a) from FIG. 2, arranged in the interspace (15). In this case, the shape of the main body of the rolling case (18a) is designed so that it is essentially complementary with the interspace (15) which is formed by the ceiling element (13) and the roof base element (12). Due to this complementarity, the rolling case (18a) forms an essentially closed, aerodynamically advantageous shape with the ceiling element (13) which is arranged on the roof base element (12) In this case, the insertion element (18) or the rolling case (18a) fits into the interspace (15) of the roof box system (100) so that only minor gap dimensions exist in the transition areas (24) between the ceiling element (13) and the insertion element (18). In case of the insertion element, which has been inserted into the interspace (15), the pull handle (20) of the rolling case (18a) is retracted and the rollers (22) are in a folded or sunk state and are essentially located in the recesses (23) which are provided on the main body of the rolling case (18a). In this case, for example, the rollers (22) may be automatically folded when pushing-in the pull handle (20) by means of a trigger mechanism which is not shown here.

In case of the roof box system (100) of FIG. 3, the upper side (25) of the roof box system (100) is formed by the ceiling element (13). The rear surface (26) as well as the outer surfaces (27) of the roof box system (100) are formed by the outer walls of the insertion element (18), or the rolling case (18a), which may advantageously be painted in the car color.

Figure 4:
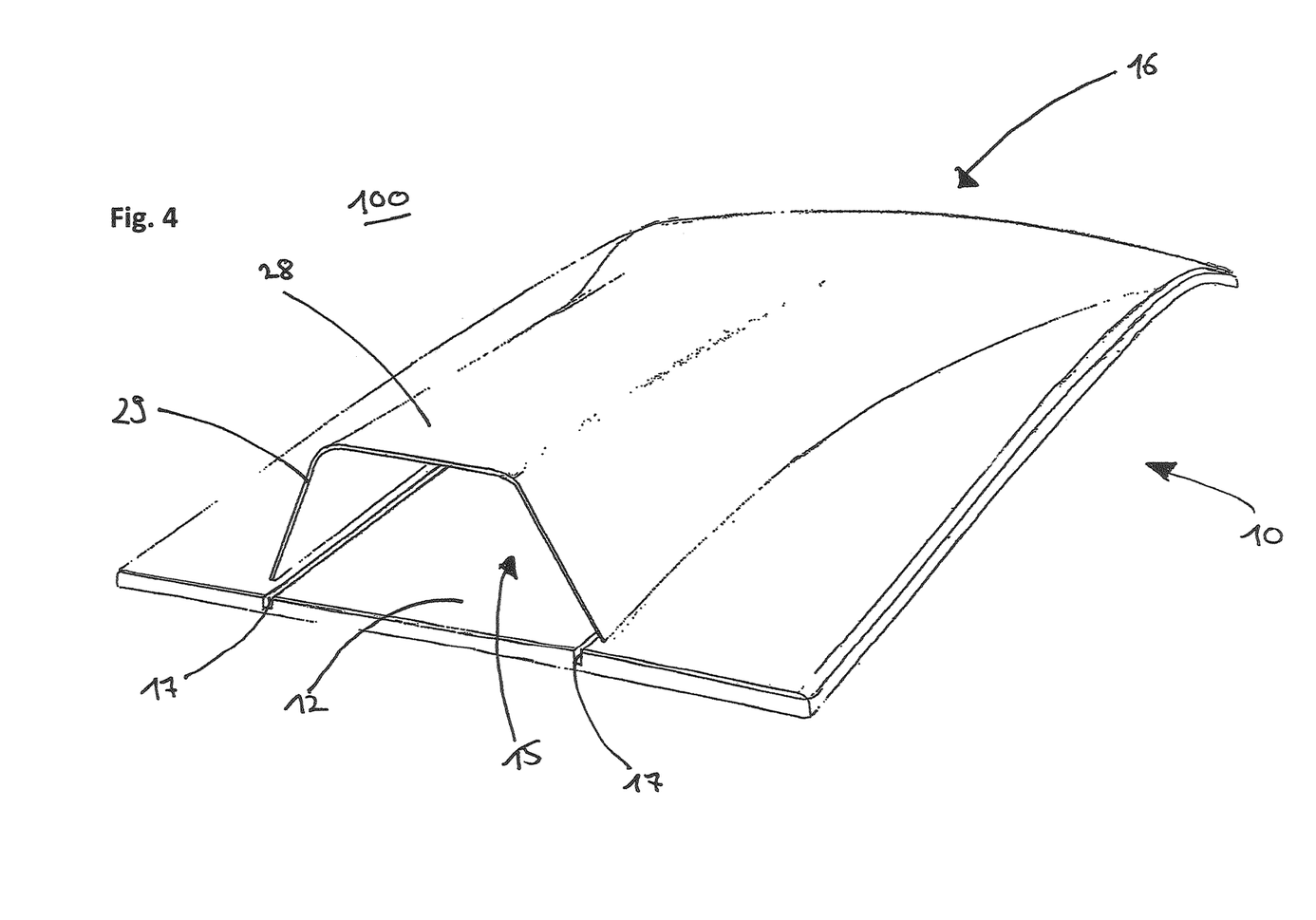
FIG. 4 shows another design type of the roof box system in case of which a section of the ceiling element has been brought into the receiving state by means of transformation means.

FIG. 4 shows another design type of the roof box system (100). Only the roof (10) of the motor vehicle (11) of the roof box system (100) including a roof base element (12) as well as a formable or bendable ceiling element (28), which is shown after being moved into the receiving state in FIG. 4, is shown here as an extract. In this case, the formable ceiling element (28) has been moved or transformed into the receiving state by means of a mechanical transformation means (29), which is a swivelable linkage in this case. In case of this special design type, the ceiling element (28) is made of a stretchable material, where the stretchable material is brought from an unstretched state into a stretched state by means of the swiveling of the linkage so that it can be moved between the initial state and the receiving state.

In the front area (16), when viewing in the driving direction of the motor vehicle (11), of the roof box system, the formed interspace (15) essentially features a wedge shape, i.e. the height of the interspace (15) decreases in the driving direction of the motor vehicle (11). When viewing in the driving direction, the horizontal width of the interspace (15) gradually increases so that an especially aerodynamic and aesthetic shape is achieved. A first guiding means in the form of guide rails (17) or guide bars is arranged on the roof base element (12) (also shown is an alternative location on the ceiling element (13) of guide rails (45) or guide bars, as discussed above). A suitable insertion element (30) for the design type of the roof box system (100) according to FIG. 4 is shown in FIG. 5.

Figure 5:
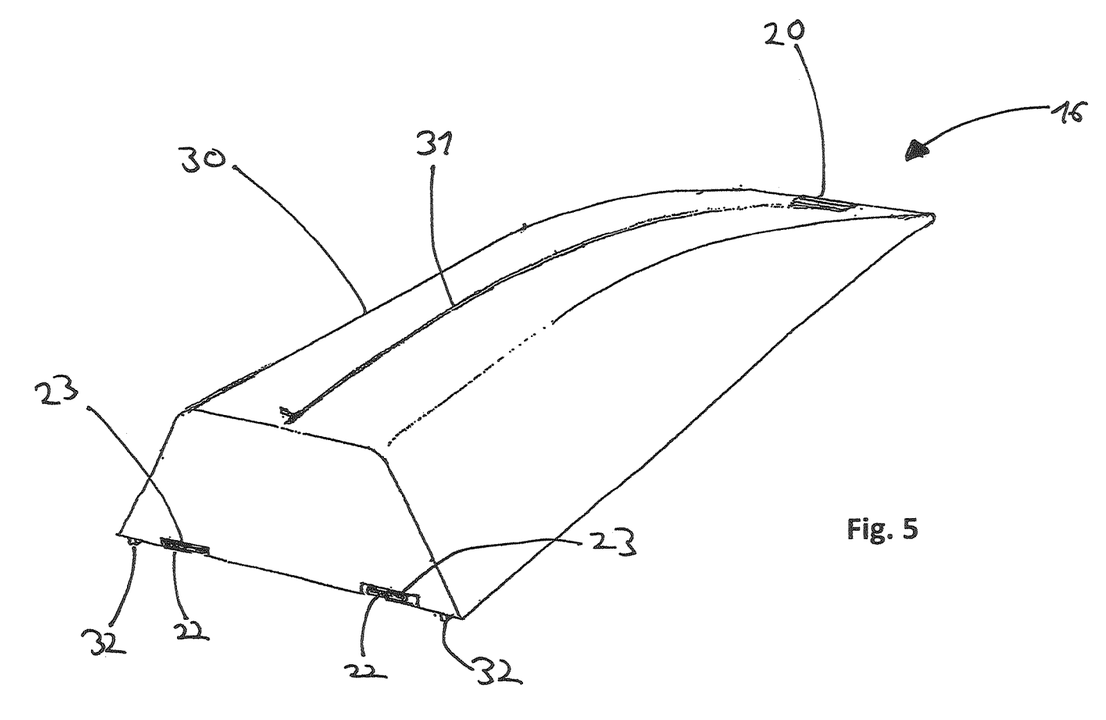
FIG. 5 shows an insertion element suitable for the roof box system from FIG. 4.

The insertion element (30) of FIG. 5 features a shape which is essentially complementary to the interspace (15) and the insertion element (30) only features a slightly smaller extension in horizontal or lateral direction in the front area (16), when viewing in the driving direction of the motor vehicle (11), of the roof base element (12). Furthermore, the insertion element (30) includes a zipper (31) on the upper side, with which the insertion element (30) may be opened. On the lower side of the insertion element (30), there is a second guiding means which is designed as guide bar (32) and which may be mechanically connected with the guide rails (17) of the roof base element (12) when the insertion element (30) is inserted into the interspace (15) of the roof box system (100) so that the insertion element (30) can be inserted into the interspace (15) repeatably and with a high positional accuracy.

On the lower side of the insertion element (30), between the guide bars (32), there are two recesses (23) or cavities near the rear side of the insertion element (30). In the state shown here, two rollers (22) are shown in the recesses (23) by means of which the insertion element (30) can be used as a rolling case when it is not in the inserted state. For this purpose, a pull handle (20) is added in the front area of the insertion element (30).

Figure 6:
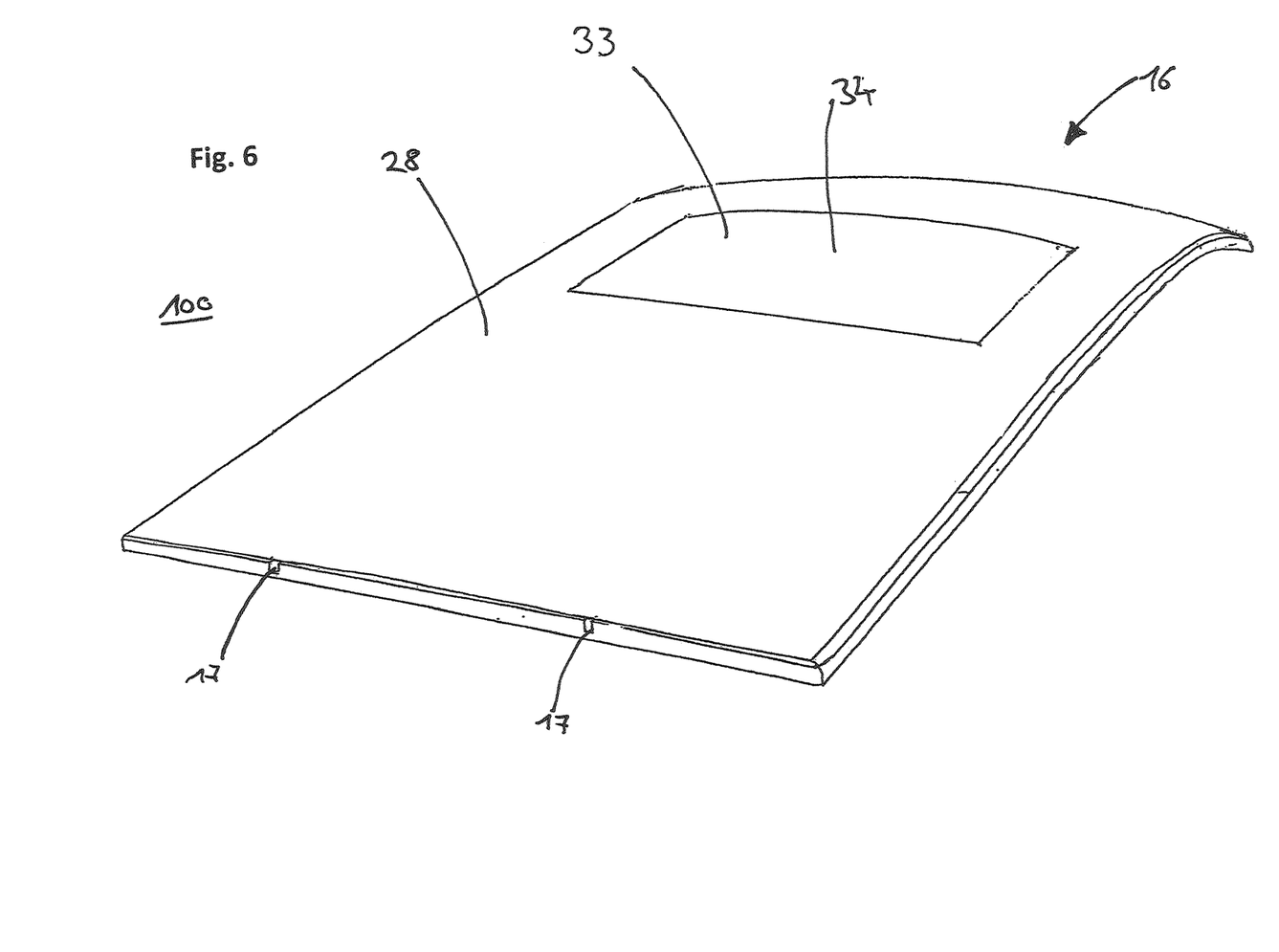
FIG. 6 shows another design type of the roof box system in the initial state which features a complementary opening in the ceiling element.
Figure 7:
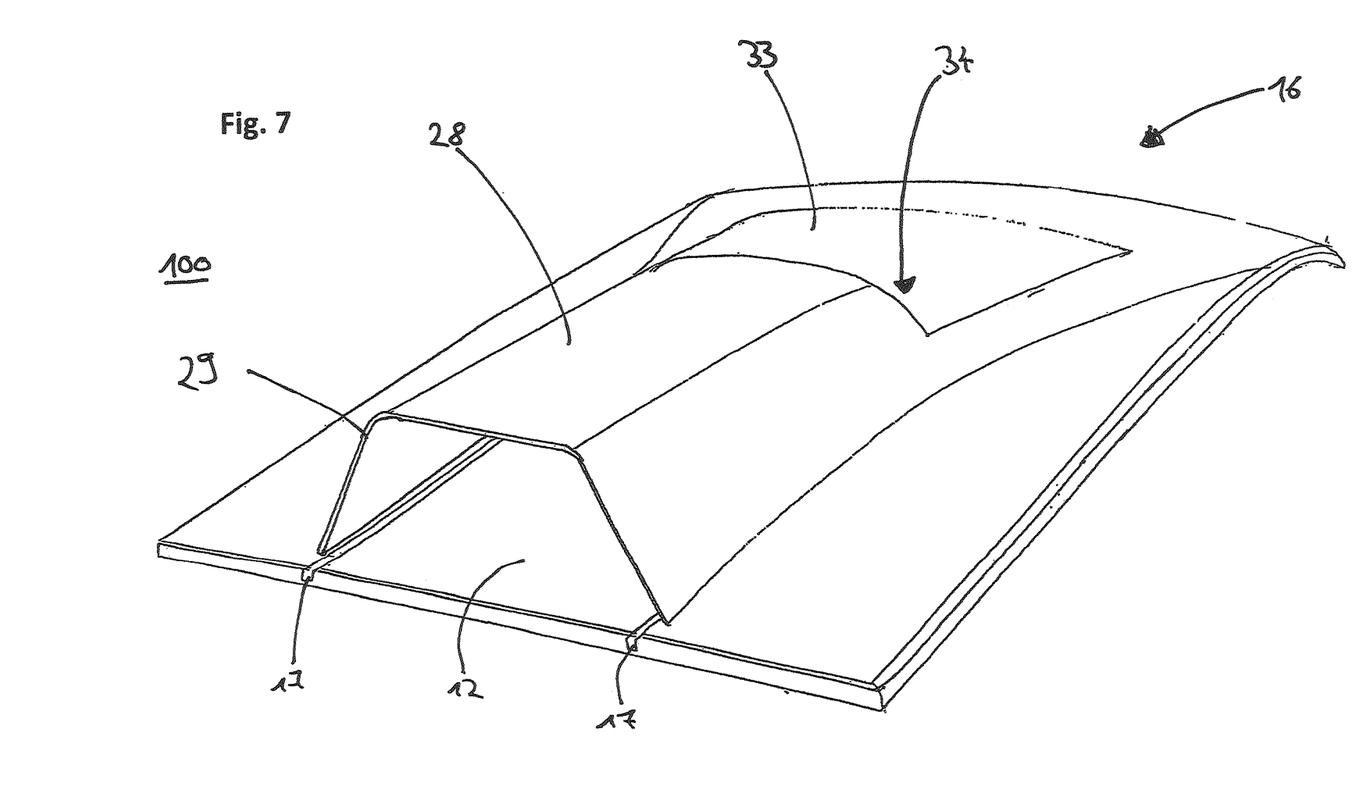
FIG. 7 shows the roof box system from FIG. 6 in the receiving state.

FIGS. 6 and 7 show another preferred design type of the roof box system (100) which is essentially identical with the roof box system (100) from FIG. 4. However, in the formable ceiling element (28) of the roof box system (100) shown in FIG. 6, a complementary opening (33), which is congruently located above the opening (34) of a sunroof which is arranged in the roof base element (12), exists in the front area (16) of the roof box system (100). In this case, the sunroof is designed so that it slightly protrudes over the roof base element (12) in vertical direction and projects into the complementary opening (34) of the formable ceiling element (28) so that the sunroof is flush with the formable ceiling element (28) in the initial state.

FIG. 7 shows the roof box system (100) of FIG. 6 in the receiving state. The stretchable material of the ceiling element (28) which has been transformed into the receiving state features the complementary opening (34) in the front area (16) of the ceiling element (28). The complementary opening (34) may be closed in a flush manner by means of an insertion element (44) and which features a, in particular, shield-shaped closing element corresponding to the complementary opening (34) in the front area.

Figure 8:
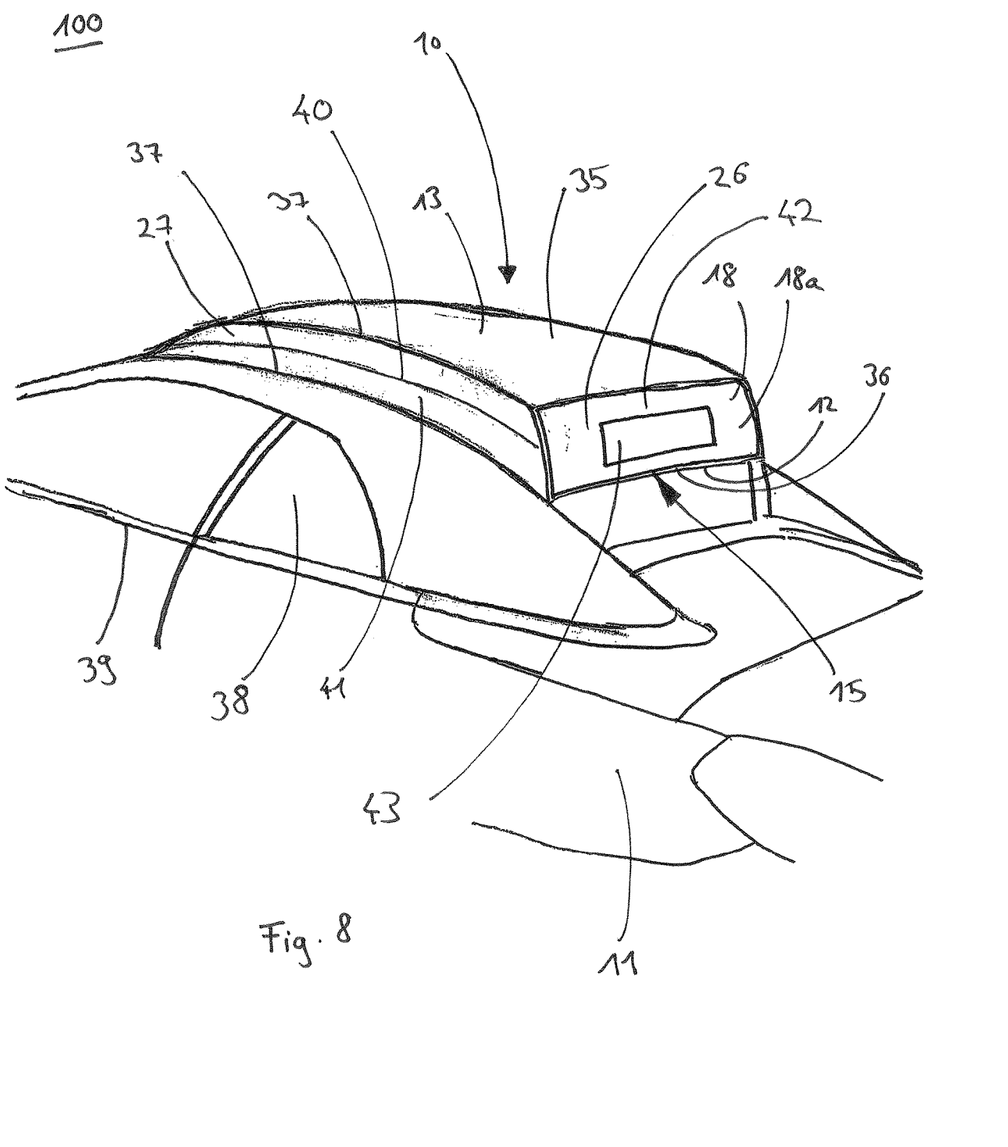
FIG. 8 shows a roof box system for a convertible roof in a perspective view.

FIG. 8 shows a roof box system (100) which is arranged on a roof (10) of a motor vehicle (11) which is designed as a convertible roof. The roof box system (100) is shown in the receiving state, where an interspace (15) is formed between the ceiling element (13) and the roof base element (12) in which an insertion element (18) which is designed as a rolling case (18a) is arranged. The roof base element (12) includes a first layer of hood material (36) which is made of a woven and impregnated material. The ceiling element (13) includes a second layer of hood material (35) which also features a woven and impregnated material. The outer surfaces (27) of the roof box system (100) consist of side walls (41) which feature an additional layer of hood material and which are fastened to the ceiling element (13) and the roof base element (12) by means of folding hinges (37). The folding hinges (37) are arranged on the side of the roof box system (100) approximately above the side windows (38) or the passenger doors (39) of the motor vehicle (11). Furthermore, the side walls (41) of the roof box system (100) which form the outer surfaces (27) of the roof box system feature a folding line (40) in the side walls (41). In the initial state, in which the ceiling element (13) lies on, or is arranged in direct vicinity of, the roof base element (12), the side wall (41) is folded along the folding line (40).

In FIG. 8, the insertion element (18), which is designed as a rolling case (18a), is arranged between the roof base element (12) and the ceiling element (13) so that the rear surface (26) of the roof box system (100) is formed by an outer wall (42) of the insertion element (18). The outer wall (42) of the insertion element (18), which forms the rear surface (26) of the roof box system (100), additionally features a display means, which is designed as a screen (43), on which, for example, the license number of the motor vehicle (11) may be displayed.

LIST OF THE REFERENCE NUMERALS

100 Roof box system for motor vehicles
10 Roof of a motor vehicle
11 Motor vehicle
12 Roof base element
13 Ceiling element
14 Passenger compartment
15 Interspace
16 Front area of the roof base element
17 Guide rails
18 Insertion element
18a Rolling case
19 First end area of the insertion element
20 Pull handle
21 Second end area of the insertion element
22 Rollers
23 Recess
24 Transition area
25 Upper-side surface of the roof box system
26 Rear surface of the roof box system
27 Outer surface of the roof box system
28 Transformable ceiling element
29 Transformation means
30 Insertion element
31 Zipper
32 Guide bar
33 Complementary opening
34 Opening in roof base element
35 Second layer of hood material
36 First layer of hood material
37 Folding hinge
38 Side window
39 Passenger door
40 Folding line
41 Side wall
42 Outer wall of the insertion element
43 Screen

The invention claimed is:

1. A roof box system for motor vehicles, wherein
the roof box system includes
a roof of a motor vehicle, which has at least one ceiling element having at least one edge at a roof base element when the at least one ceiling element is in a receiving state, the roof base element being a roof panel of the motor vehicle under the at least one ceiling element, and
an insertion body with at least one outer wall,
the at least one ceiling element is movable from an initial state to the receiving state by forming an interspace suitable for receiving the insertion body between the at least one ceiling element and the roof base element,
in the receiving state, the insertion body is arrangeable in the interspace such that the at least one outer wall of the insertion body forms an outer surface of the roof box system,
the insertion body includes a closed or lockable receiving space configured to receive transport goods.

2. A roof box system for motor vehicles, wherein
the roof box system includes
a roof of a motor vehicle, which has at least one ceiling element having at least one edge at a roof base element, the roof base element being a roof panel of the motor vehicle, and
an insertion body with at least one outer wall,
the at least one ceiling element is movable from an initial state to a receiving state by forming an interspace suitable for receiving the insertion body between the at least one ceiling element and the roof base element,
in the receiving state, the insertion body is arrangeable in the interspace such that the at least one outer wall of the insertion body forms an outer surface of the roof box system,
the insertion body includes a closed or lockable receiving space configured to receive transport goods, and
the insertion body is at least one of a wedge shape and designed as a case having rollers, where the rollers are designed so that they are at least one of sinkable into the main body of the case and foldable so that the sunk or folded rollers do not protrude from the main body of the case, and where the rollers are case guiding means.

3. The roof box system according to claim 2, wherein
a shape of the interspace formed in the receiving state and the shape of the insertion body are substantially complementary to each other, and
the insertion body when arranged in the interspace substantially or completely fills out the interspace.

4. The roof box system according to claim 3, wherein
the interspace formed in the receiving state has a substantially wedge-shaped shape which decreases in height towards a front in the direction of travel of the vehicle, and
the insertion body has a substantially wedge-shaped shape.

5. The roof box system according to claim 4, wherein
the insertion body includes at least three outer walls, and when the insertion body is arranged in the interspace in the receiving state, the at least three outer walls form two side surfaces and a rear surface of the roof box system.

6. The roof box system according to claim 5, wherein
the at least three outer walls are provided in the region between the roof base element and the ceiling element, and
the at least three outer walls are at least one of integrated into and arranged on the roof of the motor vehicle such that the at least two of the at least three outer walls in the receiving state form the two side surfaces of the roof box system.

7. The roof box system according to claim 6, wherein
the at least one ceiling element and the insertion body arranged in the receiving state in the interspace form a substantially closed, aerodynamic shape arranged at the roof base element, and
a transition area of the at least one ceiling element and the insertion body has a small gap.

8. The roof box system according to claim 1, wherein
the roof box system has a first guiding means in the form of guide rails on at least one of an inside of the at least one ceiling element and the roof base element, and
the insertion body has a second guiding means in the form of rollers that are operatively connectable to the first guiding means.

9. The roof box system according to claim 1, wherein
the insertion body is configured as a hard-top case or a rolling case having rollers configured such that the rollers are at least one of sinkable into the insertion body and foldable such that the sunk or folded rollers do not protrude from the insertion body.

10. The roof box system according to claim 1, wherein
the roof base element has an opening for a sunroof, and
the at least one ceiling element has a complementary opening corresponding to the shape of the roof base element opening, the complementary opening being arranged substantially above the opening in the roof base element such that in the initial state of the at least one ceiling element the complementary opening of at least one ceiling element is arranged substantially congruently on the opening of the roof base element, and
the insertion body has a shield-shaped closure element corresponding to the shape of the complementary opening of the at least one ceiling element, the closure element being configured such that when the insertion body is arranged in the interspace in the receiving state, the insertion body fits into the complementary opening of the at least one ceiling element.

11. The roof box system according to claim 1, wherein
the roof of the roof box system is configured as a convertible roof sinkable under a trunk cover.

12. The roof box system according to claim 1, wherein
the insertion body is a rolling suitcase that is substantially wedge-shaped, and
the suitcase has suitcase guiding means in the form of rollers configured to be at least one of sinkable into the main body of the suitcase and foldable such that the sunk or folded rollers do not protrude from the main body of the suitcase.

13. The roof box system according to claim 1, wherein
the insertion body configured to be detachably placed from outside the vehicle directly onto the roof base element without gap therebetween,
the insertion body has an interior space, and
the insertion body has volume changing means for changing a volume of the interior space which are movable between an extended state in which the interior space has a maximum volume and a retracted state in which the interior space has a minimum volume.

14. The roof box system according to claim 13, wherein
the volume changing means includes an outer wall of the insertion body, and
the volume of the interior of the insertion body is changeable by folding, compressing, relocating or pushing together at least one outer wall of the insertion body.

15. An insertion body for a roof box system, wherein
the insertion body has an interior space and volume changing means configured to change a volume of the interior space between an extended state in which the interior space has a maximum volume and a retracted state in which the interior has a minimum volume,
the insertion body has a moving means configured as rollers configured to be at least one of sinkable and foldable into a main body of the insertion body such that the sunk or folded moving means does not protrude from the main body of the insertion body,
the insertion body is configured as a rolling case having a transport means in the form of a traction means, a thrust means or a carrier means in the form of a retractable pulling handle, and
the insertion body is configured to conform to a roof base element of the rook box system configured as a roof panel of a motor vehicle, the roof box system having at least one ceiling element having at least one edge at the roof base element located under the at least one ceiling element when the at least one ceiling element is in a receiving state.

* * * * *